United States Patent [19]
Davis

[11] 3,915,775
[45] Oct. 28, 1975

[54] METHOD OF BONDING A PLASTIC TENSION RING FOR A SCREEN

[75] Inventor: Calvin D. Davis, Hollywood, Calif.

[73] Assignee: Sweco, Inc., Los Angeles, Calif.

[22] Filed: Mar. 22, 1973

[21] Appl. No.: 343,975

Related U.S. Application Data

[62] Division of Ser. No. 163,912, July 19, 1971, abandoned.

[52] U.S. Cl. ............... 156/160; 156/257; 156/295; 156/494; 209/403; 209/405
[51] Int. Cl.² ......................................... B32B 31/04
[58] Field of Search ........... 156/160, 163, 165, 228, 156/257, 245, 295, 297, 298, 299; 209/233, 403, 405, 408; 160/380; 264/197, 198, 210, 288, 291

[56] References Cited
UNITED STATES PATENTS

| | | | |
|---|---|---|---|
| 3,214,314 | 10/1965 | Rowbottam | 156/160 |
| 3,243,042 | 3/1966 | Moulton | 156/160 |
| 3,341,013 | 9/1967 | Moulton | 209/405 |
| 3,463,315 | 8/1969 | Riesbeck et al. | 209/403 |

*Primary Examiner*—Caleb Weston
*Attorney, Agent, or Firm*—Lyon & Lyon

[57] ABSTRACT

A screen and tension ring assembly is disclosed of the type used in vibratory separating machines. The screen tension ring assembly includes a lower ring portion fabricated from a rigid plastic. This lower portion has a screen adhered to its upper surface and an upper ring portion is adhered to the screen at the point at which the screen touches the lower ring portion. A flexible sealing material is located in a groove near the intersection of the upper and lower rings. The apparatus for and method of adhering a stretched screen between the upper and lower tension ring portions is also disclosed.

3 Claims, 6 Drawing Figures

METHOD OF BONDING A PLASTIC TENSION RING FOR A SCREEN

This is a division of application Ser. No. 163,912, filed July 19, 1971, now abandoned.

BACKGROUND OF THE INVENTION

This invention relates to vibratory separators employing at least one screen mounted on a tension ring. Vibratory separators of this type are disclosed in Meinzer U.S. Pat. No. 2,284,671 and Miller et al. U.S. Pat. Nos. 2,696,302; 2,714,961; 2,753,999 and 2,777,578. These separators are typically caused to vibrate by the rotation of eccentric weights. Many different methods have been used to attach a screen to a vibratory separator. These methods commonly employ the use of some type of screen tensioning ring. Tensioning rings are commonly fabricated from metal, and rings of this type are disclosed in Wright et al. U.S. Pat. No. 3,029,946; Moulten U.S. Pat. No. 3,243,042 and Swallow U.S. Pat. No. 3,291,164. When the screen is a metal screen, it may generally be attached to the tension ring by spot welding. If the screen is a fabric or plastic screen, it typically is held to the ring by clamp means.

It is generally desirable that the screen in the tension ring be stretched or at least be free from sagging. One means for stretching a vibratory separator screen is disclosed in Coulter U.S. Pat. No. 2,693,205. After stretching, the screen may then be attached to a tension ring in any suitable manner, such as by welding or clamping.

Tensioning rings have been most commonly fabricated from stainless steel because of its strength and ability to withstand corrosion, but such rings are expensive to fabricate and may be very heavy if made of solid steel. Hollow steel rings are commonly used but these too are expensive and relatively heavy. Because of the high cost of the tension rings, attempts are often made to reuse such rings by grinding off the top of the ring to a smooth surface and welding a new screen to the ring. When hollow rings are used these rescreening procedures may only be repeated a few times before the ring becomes too thin or weak at its upper surface.

Another difficulty associated with prior art rings involves the wear of the screen at the inner surface of the ring near or at the attachment to the ring. Additionally, materials which are placed on the upper surface of the screen often become embedded near the screen edge increasing the wear at this point.

Other difficulties are associated with the fabrication of a properly tensioned screen in a ring. When screen stretching means are used, a considerable amount of hand labor is involved in positioning and affixing the tensioned screen to the ring. Furthermore, it is common that an upper ring be placed above the screen at the point where the screen touches the upper surface of the bottom tension ring. This serves to protect and further seal the screen to the top surface of the lower tension ring.

SUMMARY

Accordingly, it is an object of the present invention to provide a new tension ring made from a rigid plastic material which is relatively low in cost and light in weight.

It is another object of the present invention to provide an apparatus for and method of bonding a ring, made from a rigid plastic, to a stretched metal or plastic screen.

It is yet another object of the present invention to provide means for improving screen life by reducing screen wear at the inner edge of the tension ring.

The invention is for a screen assembly for use with vibratory devices, the main body of the tension ring of which is fabricated from a rigid plastic. The main body or lower ring portion may further contain a reinforcing member, such as a metal ring having a T-shaped cross-section in order to give further structural strength to a ring of relatively large diameter. A tensioned screen is adhered between the lower ring portion and an upper ring portion. Grooves are provided in the lower ring portion for the placement of a flexible sealing material or to act as a reservoir for excess adhesive. This flexible sealing material improves the screen life by decreasing wear at the radial inner edge of the ring.

The present concepts also include a method of and apparatus for fabricating the tension ring and screen assembly. In order to fabricate a screen assembly, a screen table for tensioning or stretching the screen is used, and this table is placed so that the screen is held between an upper locating fixture and a lower locating fixture attached to the assembly fabricating apparatus. One of the fixtures holds the lower ring portion and the other fixture holds the upper ring portion. The apparatus brings these two ring portions together in an axially positioned manner and holds them together under conditions whereby the screen and the upper and lower rings are fused or adhered together. One or both of these fixtures may be provided with heating means to accelerate the adhering step. One or both of these fixtures may also be provided with cooling means to speed up production when the fabrication method includes heating of the ring portions. The apparatus further may be capable of permitting the lower ring portion to rotate with or on the lower locating fixture to facilitate the addition of the flexible sealing material to a groove in the lower ring portion. When an adhesive is used, the sealing material is preferably placed in the grooves before the adhesive is disposed on the upper surface of the lower ring portion. By this procedure the sealing material forms a dam or dike and prevents the adhesive from running onto the inside wall of the ring which could cause a wear point for the screen. Placing an excess of sealing material in this lower groove results in a forcing upward of this material through the screen when the upper and lower ring portions are brought together. The apparatus may be automated to a high degree to permit low cost fabrication of superior separator screen assemblies having rigid plastic tension rings. Also, a pair of center discs may be secured to the tensioned screen by the same apparatus. As with the tension ring, an adhesive is preferably placed on the upper surface of the lower half of the center disc when the disc has been placed on a lower locating fixture of the apparatus. This fixture may also be heated to accelerate the curing of the adhesive. The upper half of the center disc is then located above the stretched screen surface and the two disc halves are next pressed together by the apparatus as described in more detail below.

DESCRIPTION OF THE PREFERRED EMBODIMENTS

Figure 1:
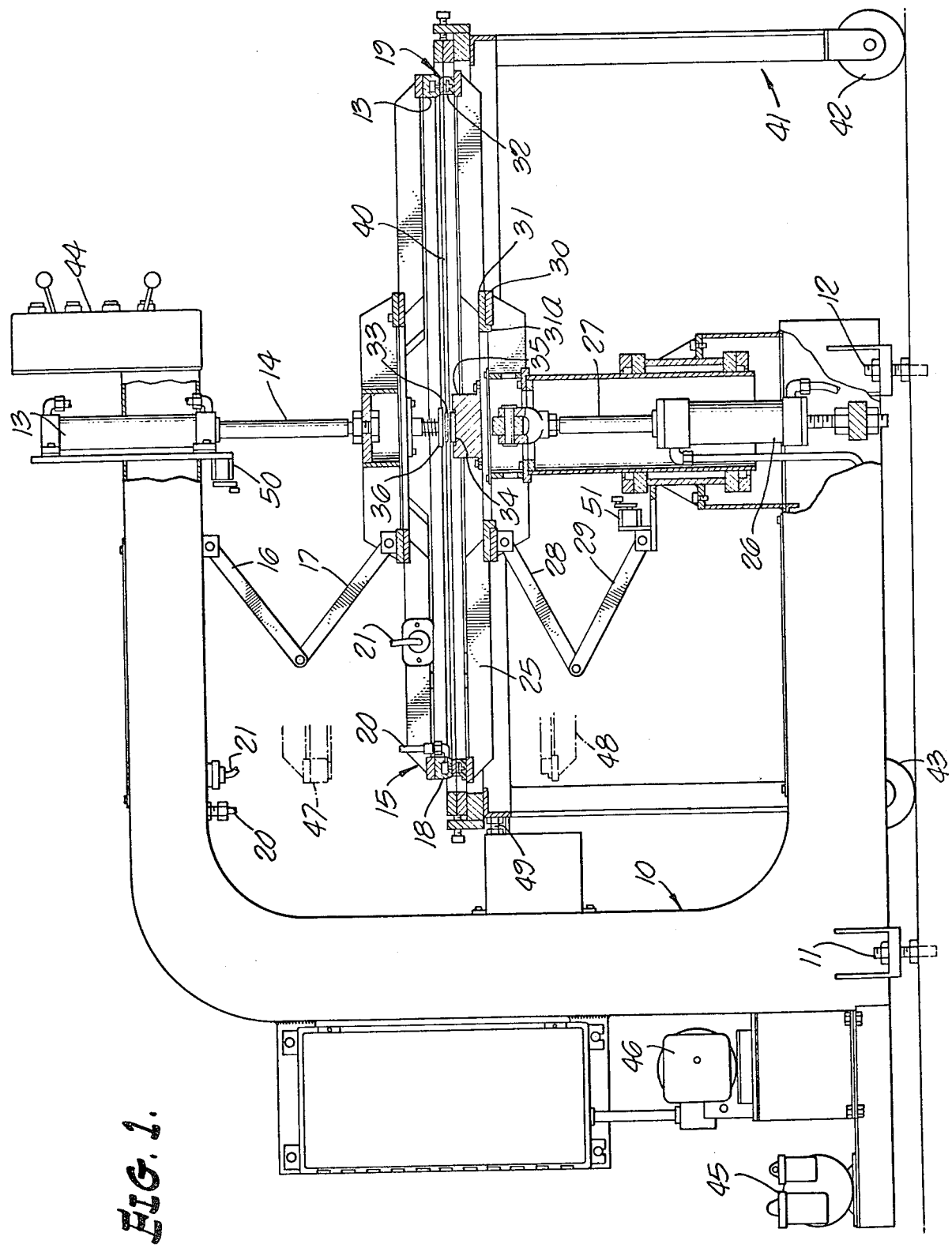
FIG. 1 is a side elevation, partly in cross-section, of the apparatus of the present invention.

The apparatus for fabricating the tension ring assembly of the present invention is shown in side elevation in FIG. 1. A frame 10 is secured to the floor by bolts such as those shown at 11 and 12. A hydraulic cylinder 13 is secured to the upper arm of frame 10. Hydraulic cylinder 13 is connected through rod 14 to upper locating fixture 15 and functions to raise and lower the fixture 15. Guide arms 16 and 17 are securely hinged to one another and to the upper arm of frame 10 and the upper surface of locating fixture 15. These arms assure the proper positioning of upper locating fixture 15. At the lower portion of fixture 15 is a ring holding member or platen 18 which serves to hold the upper portion of the tension ring 19. Ring 19 is held by vacuum which is supplied to the ring holding member 18 through vacuum connections 20. The ring holding member also may be electrically heated by heaters attached to electrical connectors 21. Provisions may be also made for cooling the ring holding member 18 by the application of circulating cooling water through the ring by conventional apparatus not shown. The circulation of cooling water helps to increase production time during the manufacture of rings which are heated to attach them to the screen.

In a similar manner, a lower locating fixture 25 is operated by a hydraulic cylinder 26 through a rod 27, the cylinder 26 being attached to the lower arm of frame 10. The fixture 25 also is guided by guide arms 28 and 29. Lower locating fixture 25 is rotatable about its central axis to facilitate the addition of adhesives and sealants to the upper surface of the lower portion of the tension ring. This is accomplished by the provision of a circular mounting platform 30. Resting on platform 30 is a circular base 31 which has a collar section 31a which permits rotation of fixture 25 but maintains a fixed central axis for the locating fixture 25. The mating surface of platform 30 and base 31 may be lubricated to facilitate rotation.

A lower tension ring portion 32 rests on the upper surface of fixture 25. The construction of ring portion 32 is described in detail below. A screen 40 is held by a screen table 41. Screen table 41 functions to hold and tension the screen prior to the joining of the upper and lower ring portions of the tension ring. Table 41 is welded steel construction and may be moved horizontally on a set of four wheels, only wheels 42 and 43 being shown in FIG. 1, to properly position the tensioned screen between the ring portions 19 and 32.

The apparatus is adapted to secure an upper and a lower center disc to the screen axially about the center of the screen. An upper disc 32 and a lower center disc 33 are shown positioned above and below screen 40. Lower center disc 33 rests in center disc locating guide 35 which may be heated. Upper disc 32 may be simply placed on the upper surface of screen 40 by hand over the area where lower disc 33 is held. Alternatively it may be secured to pressure plate 35 by means such as vacuum or a temporary adhesive. Pressure plate 35 is attached to upper locating fixture 15 through an axially movable shaft 37. Downward pressure is exerted on pressure plate 36 by the action of spring 38 and this downward pressure forces upper and lower discs 33 and 34 toward one another and against the screen 40.

During fabrication, the apparatus is operated by the controls on a control panel 44. These controls operate systems such as the vacuum system 45 and the hydraulic system 46 which are mounted to the frame. The hydraulic system is actuated to move the upper and lower fixtures 15 and 25 to the position shown in the phantom lines 47 and 48. A cured lower ring portion 32 is then centered on lower locating fixture 25 and a lower center disc 34 is placed in locating guide 35. An upper ring 19 is placed against the upper locating fixture 15 and the vacuum system is actuated to hold the ring 19 in place. Adhesives and sealants are then applied to the upper surface of lower ring portion 32 and lower center disc 34. This step may be facilitated by rotating the lower locating fixture 25 about its central axis. A screen 40 is mounted and tensioned in screen table 41 which is then rolled into the location shown in FIG. 1. When the table is moved to this position, it actuates a switch 49 which can be used to automatically complete the fabrication as described below.

The closing of switch 49 activates the hydraulic controls which operate the hydraulic system 46 and cylinders 13 and 26. Lower fixture 15 is raised and lower ring 32 and lower disc 34 are brought into contact with the lower surface of screen 40. Upper center disc 33 is then placed on screen 40 over lower disc 34. The upper locating fixture is next lowered which brings the upper and lower halves of the tension ring together at the screen and likewise brings together the upper and lower center discs. The vacuum system which holds the upper portion of the ring is turned off. After a predetermined curing time has passed the controls are operated to re-activate the hydraulic system 46 to cause fixtures 15 and 25 to re-open. When these fixtures reach limit switches 50 and 51 the cycle is terminated.

The lower fixture 25 is raised and the upper fixture 15 is lowered so that the upper and lower rings meet at screen 40. If the adhesives or sealants require heat to cure, the upper ring holding member 18 may be heated prior to or after fixture 15 has been lowered. The adhesive, if used, flows upwardly through the screen and contacts upper ring 19. This then permits a strong bond to exist between the upper ring 19, screen 40 and lower ring 32.

After the ring portions have been joined together a cooling cycle may be initiated if desired. This permits a substantial increase in production rate for these systems which require heating for attaching the upper and lower ring portions to the screen. The screen and attached ring are then removed from table 41 and the excess screen portion is cut from the finished tension ring assembly.

Figure 2:
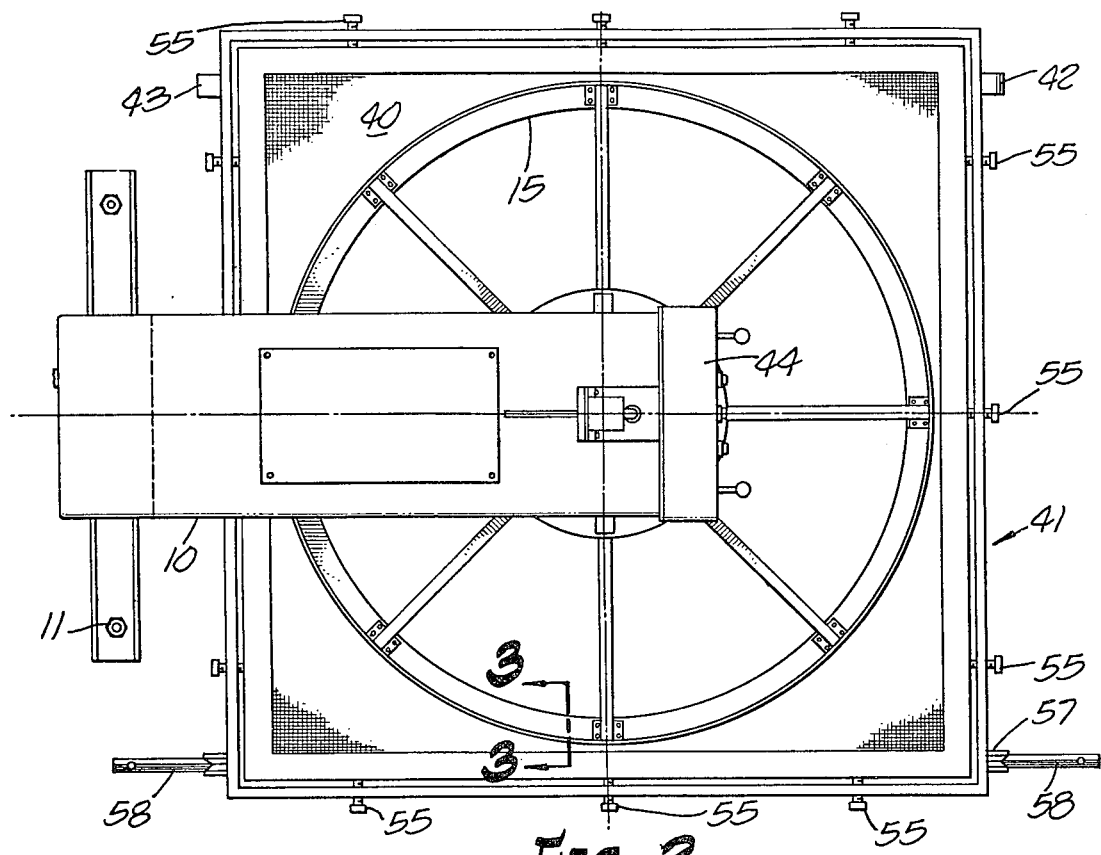
FIG. 2 is a plan view of the apparatus of FIG. 1.

A plan view of this apparatus is shown in FIG. 2. Screen 40 is held in screen table 41, having been tensioned therein by the manipulation of screws such as indicated at 55. The remaining two wheels 56 and 57 of table 41 are grooved and ride on a guide rail 58 which is attached to the floor. This serves to guide and position the screen 40 so that the upper and lower locating fixtures 15 and 25 will be properly centered on the screen.

Figure 3:
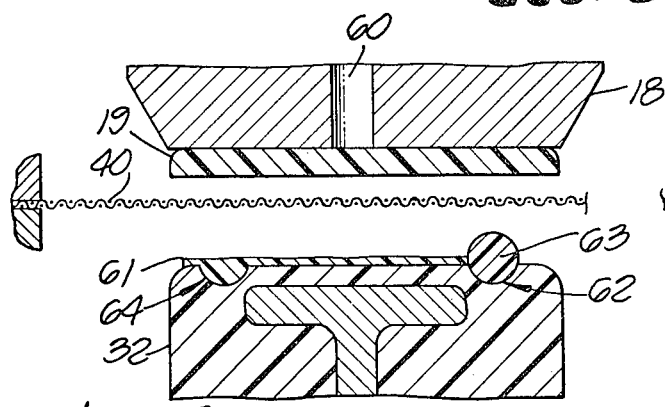
FIG. 3 is an enlarged, cross-sectional view taken along line 3—3 of FIG. 2, showing the upper and lower sections of the tension ring prior to joining.

Turning now to FIG. 3, there is shown an enlarged cross-sectional view of the upper and lower rings 19 and 32 of the tension ring just prior to contact. The upper ring holding member 18 has a series of vacuum ports 60 which hold the upper ring 19 against member 18. The upper ring 19 may be made from a plastic or from metal. It should be chosen of a material which is capable of forming a strong bond with the adhesive used to join the upper and lower ring sections together with the screen. It is particularly advantageous to use the same plastic for the upper ring portion 19 as is used for the lower ring portion 32. A layer of cement 61 such as an epoxy cement has been applied to the upper surface of ring 32. The upper surface of ring 32 is provided with two shallow grooves 62 and 64. A bead of elastomer 63 is placed in groove 62. An RTV-2 type silicone elastomer has been found to be particularly useful in this application. An excess of elastomer 63 over that needed to fill groove 62 is placed in groove 62, since a portion of this material will flow upwardly through the screen to join with upper ring 19. Groove 64 functions as an adhesive reservoir.

Figure 4:
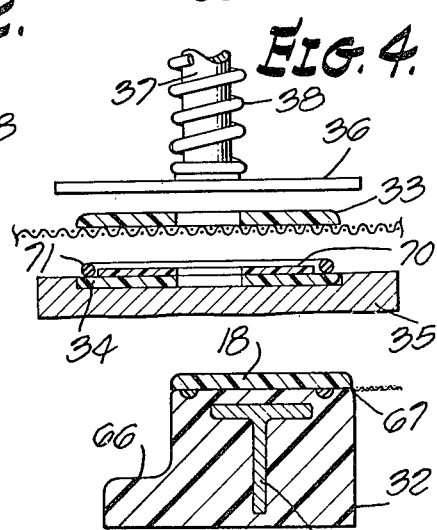
FIG. 4 is a cross-sectional view of the center disc joining portion of the apparatus of FIG. 1.

FIG. 4 is the means used to join upper and lower center discs 33 and 34 to screen 40 are illustrated. Lower disc 34 is shown positioned in locating guide 35. A layer of adhesive 70 is placed on the upper surface of disc 34. A bead of elastomer 71, preferably of the same composition as elastomer 63 is placed around the adhesive 70 and functions as a barrier to prevent the flow of adhesive beyond the edge of the discs. Upper disc 33 is placed on the screen by hand and is located concentrically above disc 34. This is preferably done after disc 34 is in physical contact with screen 40. After or simultaneously with the raising of guide 35, pressure plate 36 is lowered into contact with disc 33. Shaft 37 moves upwardly into upper fixture 15 and spring 38 forces pressure plate 36 downwardly and thus disc 33 is pressed against screen 40 and is joined with disc 34.

Figure 5:
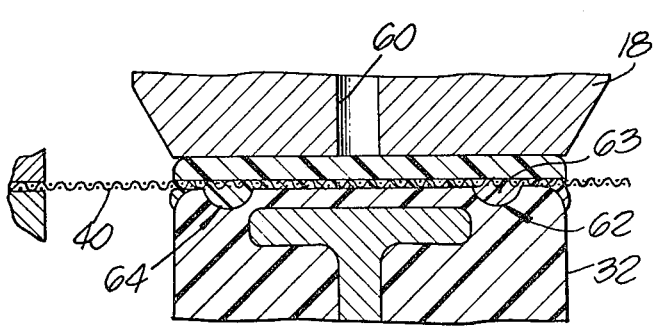
FIG. 5 is an enlarged cross-sectional view taken along line 3—3 of FIG. 2 showing the upper and lower sections of the tension ring after joining.

In FIG. 5 the upper and lower portions of the ring have been brought together and elastomer 63 has flowed through screen 40. Heat may be applied to speed the bonding process.

Figure 6:
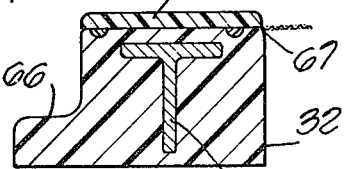
FIG. 6 is an enlarged, cross-sectional view of the plastic tension ring of the present invention.

FIG. 6 shows a cross-sectional view of the completed screen assembly. A metallic reinforcing section 65 has been molded into the lower portion of the ring 32. This functions to reinforce the tension ring. The reinforcing section is shown as a T-shape which has been found to be particularly effective. However the "T" can be in an inverted position, and other shapes such as an "L" would also function to reinforce the ring. It is not necessary for some types of plastics or for some sizes of rings that a reinforcing section be added. When the lower ring portion is fabricated from a polyester-fiberglass composition, a mild steel reinforcing ring has been found useful for tension ring sizes larger than 30 inches in diameter. It is not necessary to use a reinforcing member for smaller sizes such as 18 inch, 24 inch or 30 inch diameter rings. The type of plastic, of course, also determines the requirement for reinforcement. For plastics having less physical strength than the polyester-fiberglass, it may be desirable to use a metallic reinforcing section even for the smaller ring sizes. Conversely, for plastics stronger than polyester-fiberglass no reinforcing member may be necessary for rings larger than 30 inches.

The lower ring portion 32 has a shoulder 66 which is useful in combination with certain types of ring mounting fixtures commonly used in vibratory devices. For example, this shoulder enables clamping of the screen assembly to the spacing frame or frames of vibratory separators. Also, the lower ring portion 32 is rounded off at 67 at its inner and upper edge to help reduce the possibility that screen 40 will rub against edge portion 67 thereby weakening the screen.

The sealing material 63 functions to preserve the screen life. It is believed that this results from a combination of the flexible support that it provides at the junction of the screen and the tension ring and also from its ability to keep foreign matter from working its way into the intersection between the upper and lower portions of the ring. Such foreign matter when combined with long-term vibration can greatly reduce screen life. The sealing material 63 has the further important function during the ring fabrication of preventing excess adhesive from running from the upper surface of the lower ring into the inner side of the lower ring. Adhesive on this inner side area could cause a point of contact with the screen thereby shortening screen life.

Modifications in the apparatus shown may be made without departing from the spirit of the invention. For instance, the lower locating fixture could be vertically stationary and the screen table 41 could be provided with means for adjusting the screen height. In this case, the upper portion of screen table 41 is elevated and the table rolled into location. The screen is then lowered onto lower locating fixture 25 and then the upper locating fixture 15 is lowered against both the screen surface and the upper portion of the lower ring 19. Conversely, the upper portion could be fixed and the table and the lower locating fixture movable. Means for holding the upper ring to upper fixture 15 need not utilize a delayed tack adhesive, suction cups, magnets or the like. Although electrical heating is generally most convenient, steam heat, circulating liquid heat transfer fluid or the like may also be used. While it is generally preferable to heat only the upper portion of the ring because it is usually of thinner construction, it is also possible to heat only the lower portion of the ring or to heat both portions. In the case of thermoplastic ring materials, no adhesive need be used and the upper and lower portions can be fused together by applying a sufficient amount of heat at either the upper surface of the lower ring or the lower surface of the upper ring or both so that the plastic will fuse through the screen and join the upper and lower portions. The screen material may be of metal, fabric, or plastic. The particular choice of screen material depends upon the expected ultimate use of the vibratory device. The method used to adhere the screen to the rings must, of course, depend in part upon the particular choice of screen material.

By way of example, a tension ring was fabricated utilizing the following materials and steps. A lower tension ring was fabricated by placing the following materials in a circular mold having the configuration of the lower ring:

| All-purpose polyester resin such as that sold under the tradename of Koppers No. 3010-5 | 40% |
|---|---|
| Fiberglass roving - 60 strand | 38% |
| Fiberglass mat - 2 oz. PSF | 20% |
| Methylethyl ketone peroxide catalyst | 1% |
| Color - organic pigment | 1% |

The top portion of the tension ring and the upper and lower center discs utilized the following ingredients which were molded in a circular mold:

| All-purpose polyester resin such as that sold under the tradename Koppers No. 3010-5 | 60% |
|---|---|
| Fiberglass mat - 2 oz. PSF | 38% |
| Methylethyl ketone peroxide catalyst | 1% |
| Color - organic pigment | 1% |

The lower and upper portions of the ring were cured at room temperature for one-half hour. The cure time of course can be decreased by raising the temperature level. If the ring is of a sufficient size to require a reinforcing member this is added to the molds prior to curing of the liquid resin.

A bead of the RTV-2 silicone elastomer 63 is placed in the grooves 62. The epoxy used to bond the lower and upper rings to the screen in a two-part epichlorohydrinbisphenol A-type epoxy resin with an active primary-secondary amine catalyst such as that sold under the tradename Able Bond No. 224-1 High Strength. This is applied to the upper surface of the lower ring and lower disc and, after bringing the ring portions and screen together, cured by heating for 15 minutes at 170°F. The screen and ring assembly is then removed from the apparatus and screen tension table and the excess screen is cut away.

The dimensions of a typical lower portion of an 18 inch diameter polyester-fiberglass tension ring may be as follows: Height 0.62 inches, width at bottom 1.18 inches, width at upper surface 0.875 inches, depth of groove 0.1 inches. Compared to a steel tension ring having the same dimensions the 18 inch polyester-fiberglass ring weighs 1 pound, 13 ounces; whereas the 18 inch steel ring fabricated from 16 gage steel has a weight of 3 pounds 1½ ounces. Where a 48 inch steel tension ring weighs 16 pounds, 14 ounces, a reinforced polyester-fiberglass 48 inch ring weighs 14 pounds, 8 ounces even though it contains a steel "T" reinforcing member. Where a 60 inch steel ring weighs 20 pounds, the corresponding steel-reinforced plastic ring weighs 18 pounds.

The outer groove 64 is optional and is merely a preferred means of distributing and holding an adhesive. Other plastics may be used for the lower ring portion as long as they are capable of being adhered to the screen and to the upper ring portion. A resin which can be made to exist in the liquid state is particularly useful in that it may simply be cast in the proper shape and expensive molding equipment is not necessary. Furthermore, when the ring requires a reinforcing insert, it may more readily be placed in a liquid resin. Resins which may be thus inexpensively cast include for example epoxies, acrylates, vinyl plastisols containing polymerizable plasticizers, polyurethanes in addition to polyester resins. Any resin which may be cured or hardened to a rigid state may be used for the fabrication of the lower ring portion.

The upper portion and center discs are preferably made of the same plastic as the lower ring portion but may also be made of a different plastic or of a metal or other material. The upper portion and center discs do not need to provide the same degree of physical support as the lower ring portion and thus they may be fabricated from a more flexible material. The function of the center discs is to provide a means for tensioning the screen, by, for instance the insertion of a threaded stud through a hole in the center of the discs and the screen and the tightening of a nut on this stud downwardly against the upper disc. These discs will thus serve their purpose as long as they are fabricated from a tough material such as the plastics mentioned in the preceeding paragraph. The reinforcing bar may be fabricated from any material which has sufficient strength and compatability with the resin. Since it is not exposed at any point, carbon steel is usually a satisfactory material.

The present embodiments of this invention are to be considered in all respects as illustrative and not restrictive. The scope of the invention is indicated by the appended claims rather than by the foregoing description and all changes which come within the meaning and range of equivalency of the claims are intended to be embraced therein.

What is claimed is:

1. A method for making a screen assembly of the type useful in vibratory devices comprising:
    forming a lower ring portion having at least one groove on its upper surface near the inner edge thereof,
    forming an upper ring portion,
    placing a curable elastomer in said groove of said lower ring portion to more than fill said groove,
    coating the upper surface of said lower ring portion with an adhesive outwardly of said curable elastomer,
    positioning a tensioned screen above said lower ring portion,
    placing said upper ring portion above said screen, concentric with said lower ring,
    bringing together said upper and lower ring portions at said screen, and
    holding said upper and lower ring portions together under pressure until a bond is formed.

2. The method of claim 1 wherein the pressure exerted on said upper and lower ring portions is sufficient to force said curable elastomer inwardly from said groove to create a bead of elastomer at the junction of said screen and said upper and lower ring portions.

3. The method of claim 1 wherein a second groove is provided on the upper surface of the lower ring portion outwardly of said one groove and the pressure exerted on said upper and lower ring portions is sufficient to force excess adhesive into said second groove.

* * * * *